United States Patent
Jochi et al.

(10) Patent No.: US 6,321,167 B1
(45) Date of Patent: Nov. 20, 2001

(54) RESISTANCE-WELDING POWER SUPPLY APPARATUS

(75) Inventors: Takashi Jochi; Mikio Watanabe, both of Chiba-ken (JP)

(73) Assignee: Miyachi Technos Corporation, Chiba-ken (JP)

( * ) Notice: Subject to any disclaimer, the term of this patent is extended or adjusted under 35 U.S.C. 154(b) by 0 days.

(21) Appl. No.: 09/176,957

(22) Filed: Oct. 22, 1998

(30) Foreign Application Priority Data

Oct. 29, 1997 (JP) .................................................... 9-312827

(51) Int. Cl.$^7$ .................................................. B23K 11/24
(52) U.S. Cl. ................................ 702/60; 702/64; 702/65; 219/110
(58) Field of Search .................................. 702/60–65, 79, 702/124–126, 176, 177, 189, FOR 103, FOR 104, FOR 106, FOR 109, FOR 134, FOR 136, FOR 170, FOR 171; 219/110, 76.13, 130.4, 130.31, 130.32, 130.33, 113, 115, 130.5, 130.51, 130.1, 130.21, 137 PS, 130.01, 137.7, 137.71, 112, 108, 109, 116; 363/89, 41, 16, 17; 323/282, 349–351; 324/134; 700/296–298

(56) References Cited

U.S. PATENT DOCUMENTS

| | | | |
|---|---|---|---|
| 5,714,733 | * | 2/1998 | Moro ...................................... 219/110 |
| 5,748,462 | * | 5/1998 | Moro et al. ............................ 219/110 |
| 6,011,235 | * | 1/2000 | Mukai et al. .......................... 219/110 |

* cited by examiner

Primary Examiner—Hal Wachsman
(74) Attorney, Agent, or Firm—Wenderoth, Lind & Ponack, L.L.P.

(57) ABSTRACT

Disclosed is a resistance-welding power supply apparatus comprising a large-capacitance capacitor for storing a welding energy in the form of electric charge, a charging unit for charging the capacitor up to a predetermined voltage, a transistor group electrically connected between the capacitor and a welding electrode on one hand, and a control unit for causing a switching action of the transistor group at a predetermined frequency during the weld time to provide a control of a welding current I. The charging unit includes a charging transformer and a rectifying circuit. The control unit includes a main control unit for providing a control of the switching action of the transistor group by way of a drive circuit. The control unit further includes various sensors, measuring circuits and an arithmetic circuit, for providing a feedback control of the welding current, an interelectrode voltage or a welding power.

22 Claims, 7 Drawing Sheets

RESISTANCE-WELDING POWER SUPPLY APPARATUS

BACKGROUND OF THE INVENTION

1. Field of the Invention

The present invention relates generally to a power supply apparatus for resistance welding, and more particularly to a power supply apparatus of a type using transistors for the control of a welding current.

2. Description of the Related Art

In order to provide a control of a welding current discharged from a capacitor for storing a welding energy, a transistor-type resistance welding power supply apparatus makes substantial use of only transistors intervening between the capacitor and welding electrodes without interposing a welding transformer therebetween. This system is considered to be advantageous for use in fine spot welding due to rapid build-up properties of the welding current and to an arbitrary provision of upslope or downslope waveform control.

Such a power supply apparatus ordinarily provides a feedback constant power control so as to allow the amount of welding heat to be kept at a certain value in spite of a possible change in the welding current or a voltage across welding electrodes during the weld time. For the provision of this feedback control, a shunt resistor is disposed in a power supply circuit to detect the welding current, with voltage sensor leads connected to the welding electrodes or their support members to detect a voltage between the welding electrodes so that the welding power is computed from the welding current detection value and the voltage detection value. Note that the transistor is in the form of a transistor group including several tens of transistors which are connected in parallel to one another, each transistor being a power transistor such as an FET or IGBT which withstands a large amount of current.

Such a conventional resistance welding power supply apparatus causes the transistor group to act as a kind of variable resistor between the capacitor and the welding electrodes so that provision is made of a control of the welding current so as to allow the welding power to coincide with the set value, for example, as described above. For this reason, there arises a problem that the transistor group may consume as the resistance heat in vain most of the energy discharged (fed) from the capacitor, resulting in a poor power supply efficiency. Furthermore, such a poor efficiency may prevent an acquisition of a large amount of current or elongated weld time.

SUMMARY OF THE INVENTION

The present invention was conceived in view of the above problems. It is therefore the object of the present invention to provide a capacitor-type resistance welding power supply apparatus ensuring an improved power supply efficiency as well as an acquisition of a large amount of welding current and longer weld time.

In order to achieve the above object, according to a first aspect of the present invention, there is provided a resistance-welding power supply apparatus for resistance welding materials to be welded by causing a welding current to flow through a pair of welding electrodes which are in press contact with said materials to be welded, the resistance-welding power supply apparatus comprising a capacitor having one end electrically connected to one of the pair of welding electrodes, for storing a welding energy in the form of electric charge; charging means for charging the capacitor; a transistor having a first terminal electrically connected to the other end of the capacitor and having a second terminal electrically connected to the other of the pair of welding electrode; and control means electrically connected to a control terminal of the transistor, for providing a switching control of the transistor at a predetermined frequency during a preset weld time.

In the above configuration, the transistor may comprise a plurality of transistors which are connected in parallel with one another.

According to a second aspect of the present invention, there is provided a resistance-welding power supply apparatus for resistance welding materials to be welded by causing a welding current to flow through a pair of welding electrodes which are in press contact with the materials to be welded, the resistance-welding power supply apparatus comprising a capacitor for storing a welding energy in the form of electric charge; charging means for charging the capacitor; a first transistor having a first terminal electrically connected to one of the pair of welding electrodes and having a second terminal electrically connected to one end of the capacitor; a second transistor having a first terminal electrically connected to the other end of the capacitor and having a second terminal electrically connected to the other of the pair of welding electrodes; a third transistor having a first terminal electrically connected to the other of the pair of welding electrodes and having a second terminal electrically connected to the one end of the capacitor; a fourth transistor having a first terminal electrically connected to the other end of the capacitor and having a second terminal electrically connected to the one of the pair of welding electrodes; control means electrically connected to the first to fourth transistors via their respective control terminals, for providing a switching control of the first and second transistors or of the third and fourth transistors at a predetermined frequency during a preset weld time.

In the above configuration, the first to fourth transistors may each comprise a plurality of transistors which are connected in parallel with one another.

Preferably, the charging means include a transformer for stepping down an AC power supply voltage having a commercial frequency to a predetermined voltage; and a rectifying circuit for rectifying the AC voltage from the transformer into a DC voltage for the output.

Preferably, the control means provide a switching control of the first and second transistors, with the third and fourth transistors remaining off, during a first weld time constituting each weld time together with a second weld time for resistance welding, and the control means provide a switching control of the third and fourth transistors, with the first and second transistors remaining off, during a second weld time constituting each weld time together with a first weld time for resistance-welding.

The control means may include current measuring means for measuring the welding current during the weld time; current setting means for providing a desired welding current set value; current comparing means for comparing a welding current measurement value from the current measuring means with the welding current set value to obtain a comparison error for each unit cycle of the frequency; and pulse width control means for providing a control of a pulse width for a switching-on time in the next unit cycle in response to the comparison error.

The control means may include voltage measuring means for measuring a voltage between the pair of welding electrodes during the weld time; voltage setting means for providing a desired interelectrode voltage set value; voltage comparing means for comparing an interelectrode voltage measurement value from the voltage measuring means with the interelectrode voltage set value to obtain a comparison error for each unit cycle of the frequency; and pulse width control means for providing a control of a pulse width for a switching-on time in the next unit cycle in response to the comparison error.

The control means may include current measuring means for measuring the welding current during the weld time; voltage measuring means for measuring a voltage between the pair of welding electrodes during the weld time; power computing means for figuring out a welding power fed in between the pair of welding electrodes, on the basis of a welding current measurement value from the current measuring means and of an interelectrode voltage measurement value from the voltage measuring means; power setting means for providing a desired welding power set value; power comparing means for comparing a welding power computed value from the power computing means with the welding power set value to obtain a comparison error for each unit cycle of the frequency; and pulse width control means for providing a control of a pulse width for a switching-on time in the next unit cycle in response to the comparison error.

Preferably, the control means issue one or several low-frequency pulses having a large pulse width immediately after the start of the weld time, after which a switching to a predetermined high frequency is made to provide the pulse width control.

BRIEF DESCRIPTION OF THE DRAWINGS

The above and other objects, aspects, features, and advantages of the present invention will become more apparent from the following detailed description when reference is made to the accompanying drawings, in which.

DESCRIPTION OF THE PREFERRED EMBODIMENTS

Preferred embodiments of the present invention will now be described with reference to the accompanying drawings.

Figure 1:
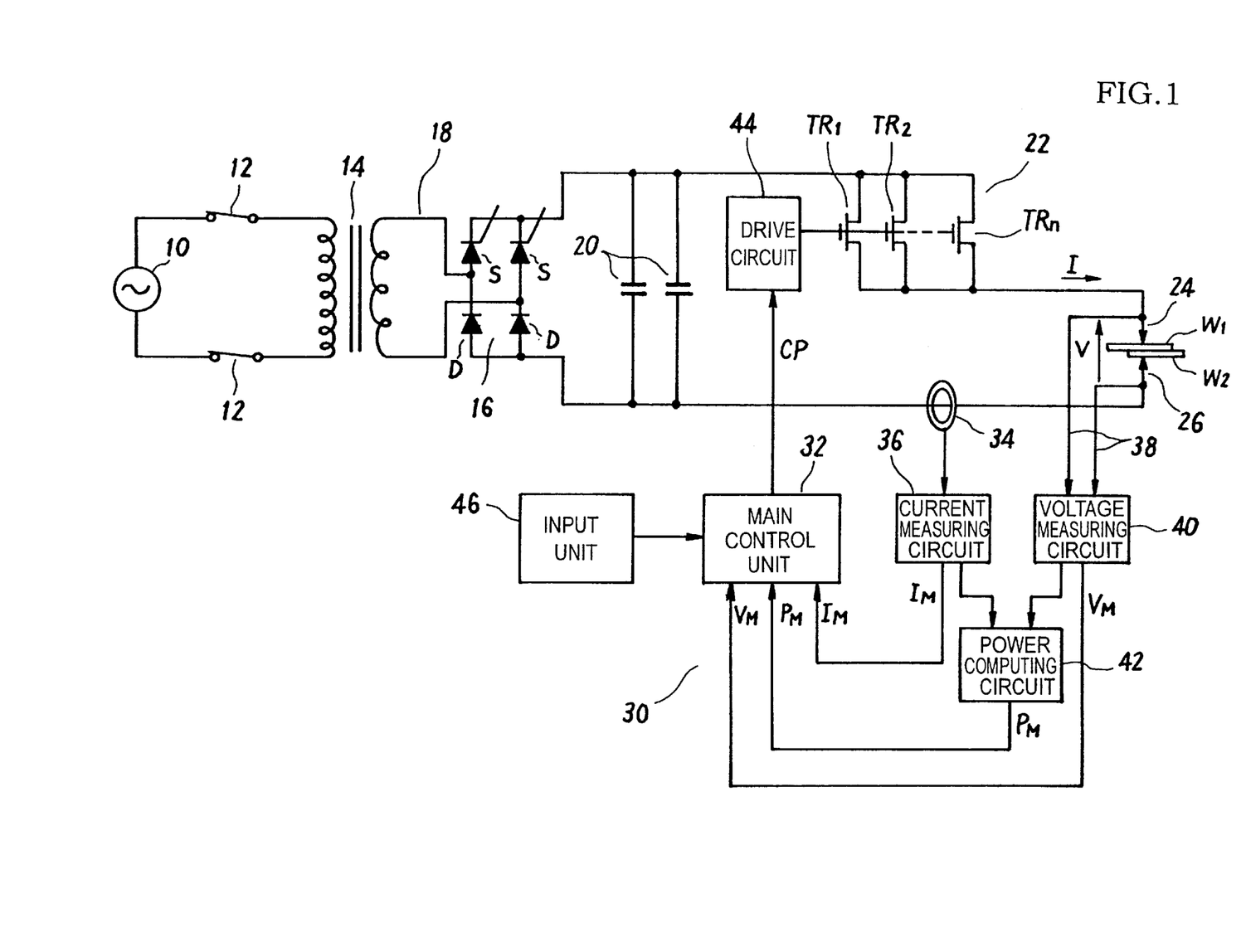
FIG. 1 is a block diagram showing a configuration of a resistance-welding power supply apparatus in accordance with an embodiment of the present invention.

FIG. 1 illustrates a configuration of a resistance-welding power supply apparatus in accordance with an embodiment of the present invention.

The resistance-welding power supply apparatus comprises a large-capacitance capacitor 20 for storing welding energy in the form of electric charge, a charging unit 18 for charging the capacitor 20 up to a predetermined voltage, a plurality of transistors (a transistor group) 22 electrically connected in parallel with one another between the capacitor 20 and a welding electrode 24 on one hand, and a control unit 30 for allowing a switching action of the transistor group 22 at a predetermined frequency during the weld time to thereby provide a control of a welding current I.

The charging unit 18 includes a charging transformer 14 and a rectifying circuit 16. The charging transformer 14 has a primary coil connected via a main power supply switch 12 to an AC power supply 10 (e.g., 200V) with a commercial frequency, and a secondary coil for providing as its output a voltage which has been stepped down to, e.g., 30V. The rectifying circuit 16 is in the form of a single-phase hybrid bridge rectifier consisting of two thyristors S and two diodes D which are bridge-connected to each other. The rectifying circuit 16 rectifies an AC voltage from the charging transformer 14 into a DC voltage to charge the capacitor 20 up to a predetermined voltage, e.g., 24V. Note that the thyristors S are controlled so as to be fired in synchronism with a cycle of the commercial AC power supply 10 by means of a firing circuit for charging (not shown).

The capacitor 20 can be a single or a plurality of low-voltage large-capacitance type capacitors which are connected in parallel with one another, having a capacitance of the order of, e.g., 1.2 F.

The transistor group 22 includes a plurality of, e.g., 25 parallel connected high-speed transistors $TR_1, TR_2, \ldots TR_n$ such as FETs (field-effect transistors) or IGBTs (insulated gate bipolar transistors), with each transistor $TR_i$ having a first terminal (e.g., collector or drain) electrically connected to a terminal on one hand of the capacitor 20 and a second terminal (emitter or source) electrically connected to the welding electrode 24 on the other. Each transistor $TR_i$ further has a control terminal (base or gate) connected to an output terminal of a drive circuit 44.

The welding electrode 24 and a welding electrode 26 are coupled to a pressing mechanism (not shown) so that they are brought into press contact with materials W1 and W2 to be welded together during the welding operation. Note that the welding electrode 26 is electrically connected to a terminal of the capacitor 20.

The control unit 30 includes a main control unit 32 for providing a control of the switching action of the transistor group 22 by way of the drive circuit 44. The control unit 30 may further include various sensors, measuring circuits, and computing circuits for providing a feedback control of a welding current I, an interelectrode voltage, or a welding power.

This configuration includes a current sensor 34 in the form of, e.g., a toroidal coil attached to a conductor through which the welding current I flows, a current measuring circuit 36 connected to an output terminal of the current sensor 34, a voltage measuring circuit 40 connected via voltage sensor leads 38 to the two welding electrodes 24 and 26, and a power computing circuit 42 connected to output terminals of both the current measuring circuit 36 and the voltage measuring circuit 40.

On the basis of an output signal from the current sensor 34, the current measuring circuit 36 acquires, as a current measurement value, and effective value or a mean value of the welding current I for each cycle of a switching frequency, to impart each current measurement value $I_m$ to the main control unit 32.

On the basis of an interelectrode voltage detection signal fed through the voltage sensor leads 38, the voltage measuring circuit 40 acquires, as an interelectrode voltage measurement value, an effective value or a mean value of an interelectrode voltage V for each cycle of the switching frequency, to impart each voltage measurement value $V_m$ to the main control unit 32.

Based on a current measurement value from the current measuring circuit 36 and on an interelectrode voltage measurement value from the voltage measuring circuit 40, the power computing circuit 42 computes a welding power for each cycle to impart each welding power computed value $P_M$ to the main control unit 32.

It is to be appreciated that the current measuring circuit 36, the voltage measuring circuit 40 and the power computing circuit 42 can be either analog circuits or digital circuits. In case of using the analog circuits, their respective output signals (measurement values, computed value) could be converted by an analog-to-digital converter (not shown) into digital signals, the resultant signals being fed to the main control unit 32.

The main control unit 32 can be a microprocessor (CPU), a dedicated logic circuit or the like and includes functions of a setting unit, a sequence control unit, a PWM (pulse width modulation) control unit, etc., as will be described later.

An input unit 46 consists of pointing devices such as a keyboard and a mouse, and of a desired interface circuit. Entered through the input unit 46 are data in the form of set values of various conditions including weld time, pulse width initial value, welding current, interelectrode voltage and welding power. The data entered through the input unit 46 are held by a memory in the main control unit 32.

Figure 2:
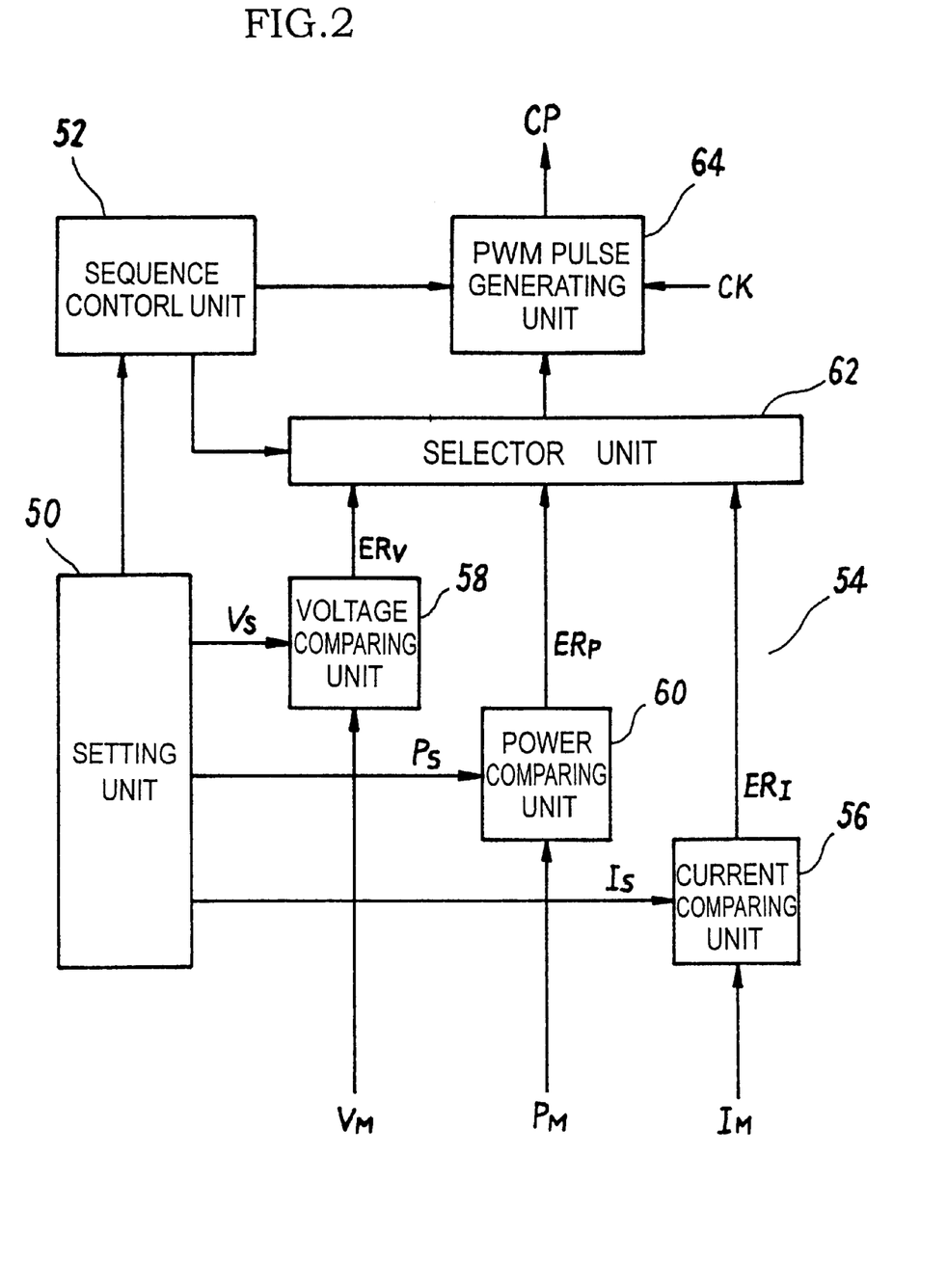
FIG. 2 is a block diagram showing a functional configuration of a main control unit of the power supply apparatus according to the present invention.

FIG. 2 is a block diagram showing a functional configuration of the main control unit 32.

From functional aspects, the main control unit 32 comprises a setting unit 50 for imparting to the respective units the set values (data) of various conditions entered through the input unit 46, a sequence control unit 52 for providing a control of the weld time, a comparing unit 54 for comparing measurement values or a computed value with the set values to obtain comparison errors for feedback control, a selector unit 62 for selecting one of the various comparison errors derived from the comparing unit 54, and a PWM pulse generating unit 64 for determining a control pulse width in the next cycle in response to the comparison error selected by the selector unit 62 to generate a control pulse CP having this pulse width.

The comparing unit 54 includes a current comparing unit 56 for comparing the welding current measurement value $I_M$ from the current measuring circuit 36 with a welding current set value $I_S$ to obtain a current comparison error $ER_I$, a voltage comparing unit 58 for comparing the interelectrode voltage measurement value $V_M$ from the voltage measuring circuit 40 with an interelectrode voltage set value $V_S$ to obtain a voltage comparison error $ER_V$, and a power comparing unit 60 for comparing the welding power computed value $P_M$ from the power computing circuit 42 with a welding power set value $P_S$ to obtain a power comparison error $ER_P$.

The set values $I_S$, $V_S$ and $P_S$ fed by the setting unit 50 may be desired fixed values or may be waveform values which vary arbitrarily with time in the form of desired waveforms.

If the selector unit 62 selects the current comparison error $ER_I$ from the current comparing unit 56, the PWM pulse generating unit 64 generates a control pulse CP for causing the welding current I to coincide with the welding current set value $I_S$. If a selection is made of the voltage comparison error $ER_V$ from the voltage comparing unit 58, generated is a control pulse CP for causing the interelectrode voltage V to coincide with the interelectrode voltage set value $V_S$. If the power comparison error $ER_P$ from the power comparing unit 60 is selected, there occurs a generation of a control pulse CP for causing the welding power P to coincide with the welding power set value $P_S$.

The PWM pulse generating unit 64 not merely accepts the comparison error signals ER from the selector unit 62 but also accepts a clock CK having a high frequency, e.g., 20 kHz defining the frequency (switching frequency) f of the control pulse CP from a clock circuit (not shown). During the weld time, the PWM pulse generating unit 64 operates under the control of the sequence control unit 52.

Figure 3:
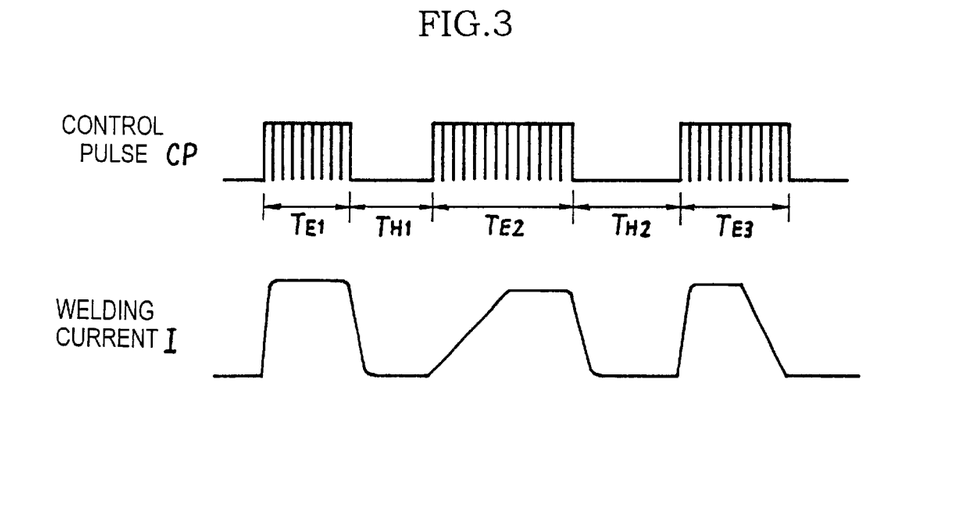
FIG. 3 is a waveform diagram showing an example of operations of the power supply apparatus according to the present invention.

FIG. 3 illustrates by way of example an operation of this resistance welding control unit. In FIG. 3, weld time $TE_{E1}$, $TE_{E2}$, $TE_{E3}$, etc., is defined as a time during which the sequence control unit 52 allows an action of the PWM pulse generating unit 64 in compliance with a weld time set value registered in the setting unit 50. Halt time $T_{H1}$, $T_{H2}$, etc., is a time during which the sequence control unit 52 halts the action of the PWM pulse generating unit 64 in compliance with a halt time set value registered in the setting unit 50.

During each weld time $T_E$, the PWM pulse generating unit 64 issues a control pulse CP at the switching frequency f (20 kHz), in response to which control pulse CP the drive circuit 44 provides a switching drive of all the transistors $TR_1$, $TR_2$, ... $TR_n$ of the transistor group 22 simultaneously, that is, at the same timing.

Such a switching action of all the transistors $TR_1$, $TR_2$, ... $TR_n$ of the transistor group 22 allows the capacitor (s) 20 to release the electric charge via the transistor group 22 to the welding electrodes 24 and 26 and to the materials $W_1$ and $W_2$ to be welded together, allowing a flow of direct welding current I.

At that time, each transistor $TR_i$ of the transistor group 22 repeats its on-off action at a high frequency, with its on-action causing a conduction in a saturated state, so that a less resistance heat is gererated, resulting in a reduced power loss. This allows energy released (discharged) from the capacitor(s) 20 to be effectively delivered to the materials $W_1$ and $W_2$ to be welded together, making it possible to provide a flow of a large quantity of welding current I as well as to elongate each weld time $T_E$.

Furthermore, the PWM control of a feedback method is employed for providing a variable control of the pulse width of the control pulse CP, so that it is possible to control the waveforms of the welding current I, interelectrode voltage V and welding power P so as to have arbitrary patterns.

Figure 4A:
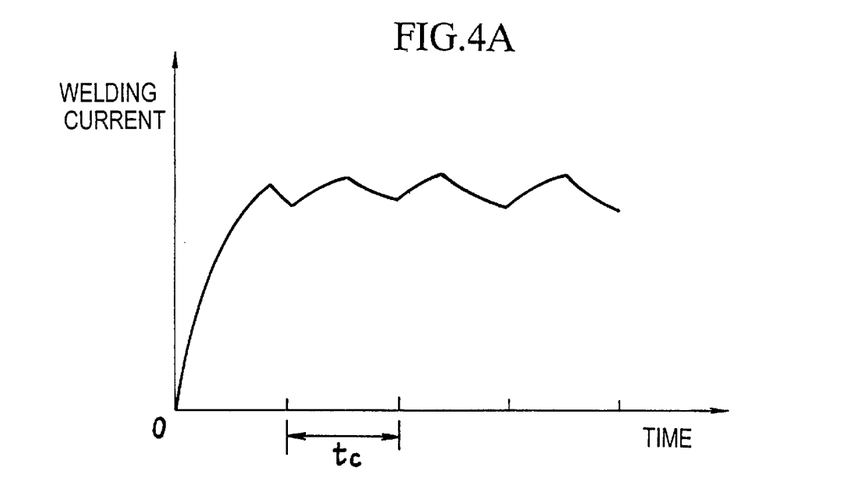
FIGS. 4A and 4B are waveform diagrams showing an example of a welding current build-up when almost a maximum pulse width is applied in accordance with the present invention.
Figure 4B:
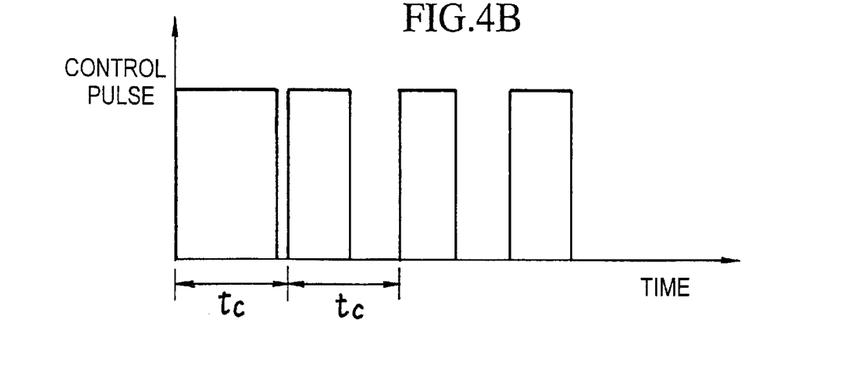

As is apparent from FIGS. 4A and 4B, the build-up time of the welding current I can be reduced by setting to the maximum pulse width or its vicinity the pulse width (pulse width initial value) of the control pulse CP first output immediately after the start of the weld time $T_E$ upon the build-up of the welding current I.

Figure 5A:
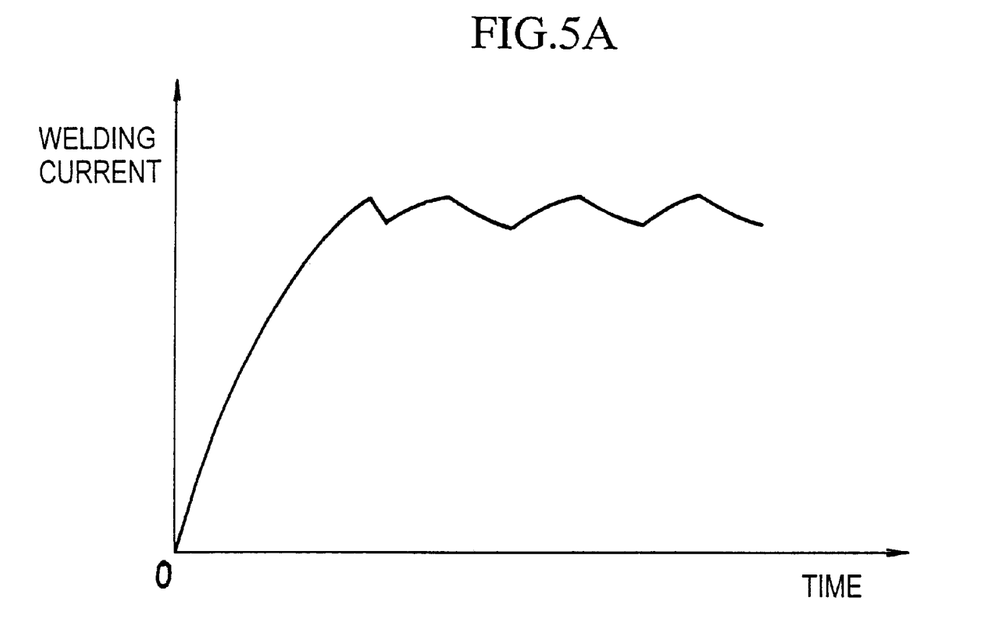
FIGS. 5A and 5B are waveform diagrams showing another example of the welding current build-up when a pulse width exceeding the maximum pulse width is applied in accordance with the present invention.
Figure 5B:
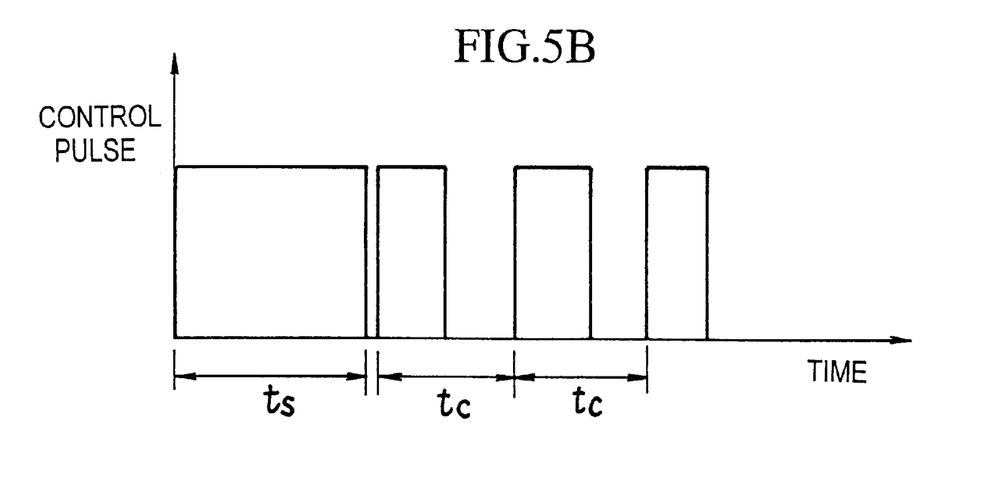

Alternatively, as shown in FIGS. 5A and 5B, the PWM control may be provided through a changeover to the switching frequency f after the output of one or several pulses having a pulse width ts exceeding the maximum pulse width (tc) of the switching frequency f immediately after the start of the weld time. This method achieves a further reduction of the build-up time and is advantageous when using a welding current I set to a large current value. using a welding current I set to a large current value.

In this manner, this resistance-welding control unit provides excellent build-up characteristics and a waveform control as well as a high power supply efficiency, with the securement of an increased welding current and elongated weld time, whereby it is applicable to various metal materials (materials to be welded) in fine spot welding and ensures a reliable weld quality.

Figure 6:
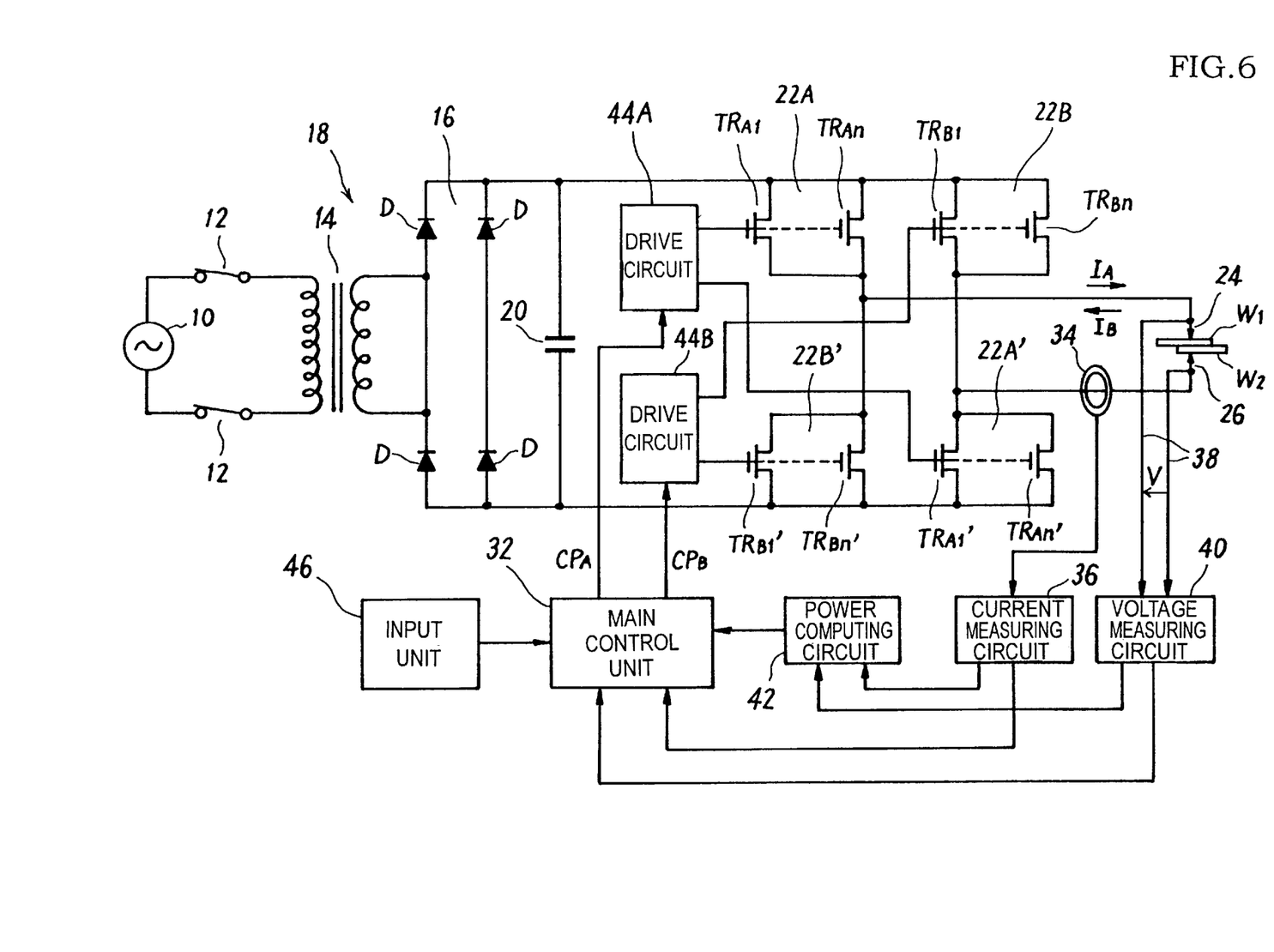
FIG. 6 is a block diagram showing a configuration of the resistance-welding power supply apparatus in accordance with another embodiment of the present invention.

FIG. 6 illustrates a configuration of a resistance-welding power supply apparatus in accordance with another embodiment of the present invention. In the diagram, the same reference numerals are imparted to parts having the same configurations and functions as those in the power supply apparatus of the above first embodiment.

This resistance-welding power supply apparatus comprises four sets of transistors, that is, first to forth transistor groups 22A', 22A, 22B' and 22B.

The first transistor group 22A' includes a predetermined number of, e.g., 25 high-speed transistors $TR_{A1'}$ to $TR_{An'}$ such as FETs or IGBTs which are connected in parallel with one another, with each transistor $TR_{Ai'}$ having a first terminal electrically connected to the welding electrode 26 and a second terminal electrically connected to a terminal of the capacitor 20. Each transistor $TR_{Ai'}$ further has a control terminal connected to a first output terminal of a drive circuit 44A.

The second transistor group 22A includes a predetermined number of, e.g., 25 high-speed transistors $TR_{A1}$ to $TR_{An}$ such as FETs or IGBTs which are connected in parallel with one another, with each transistor $TR_{Ai}$ having a first terminal electrically connected to a terminal of the capacitor 20 and a second terminal electrically connected to the welding electrode 24. Each transistor $TR_{Ai}$ further has a control terminal connected to a second output terminal of the drive circuit 44A.

The third transistor group 22B' includes a predetermined number of, e.g., 25 high-speed transistors $TR_{B1'}$ to $TR_{Bn'}$ such as FETs or IGBTs which are connected in parallel with one another, with each transistor $TR_{Bi'}$ having a first terminal electrically connected to the welding electrode 24 on the other and a second terminal electrically connected to the terminal of the capacitor 20. Each transistor $TR_{Ai'}$ further has a control terminal connected to a first output terminal of a drive circuit 44B.

The fourth transistor group 22B includes a predetermined number of, e.g., 25 high-speed transistors $TR_{B1}$ to $TR_{Bn}$ such as FETs or IGBTs which are connected in parallel with one another, with each transistor $TR_{Bi}$ having a first terminal electrically connected to the terminal of the capacitor 20 and a second terminal electrically connected to the welding electrode 26. Each transistor $TR_{Bi}$ further has a control terminal connected to a second output terminal of the drive circuit 44B.

In this resistance-welding power supply apparatus, the main control unit 32 provides a control such that a selective switching action is conferred on the first and second transistor groups (22A', 22A) and the third and fourth transistor groups (22B', 22B) by way of the drive circuits 44A and 44B, respectively.

When the first and second transistor groups (22A', 22A) undergo the selective switching action, a normal direction welding current $I_A$ flows through the welding electrodes 24, 26 and the materials $W_1$, $W_2$ to be welded together. This mode corresponds to the power supply apparatus in accordance with the first embodiment described above.

On the contrary, the selective switching action of the third and fourth transistor groups (22B', 22B) allows a reverse direction welding current $I_B$ to flow therethrough.

This resistance-welding power supply apparatus is conveniently applied to two-point simultaneous joint-type resistance welding (series welding). Referring then to FIGS. 7A to 7D, FIGS. 8 and 9, description is made of its operation in case of application to the series welding.

Figure 7:
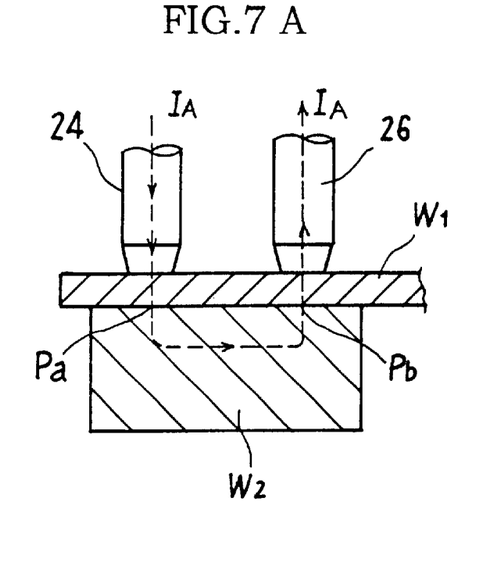
FIGS. 7A to 7D are fragmentary sectional views showing operations at welding parts in case the power supply apparatus of FIG. 6 is applied to a series welding.

In case a seam welding is done for the materials ($W_1$, $W_2$) to be welded together as shown in FIG. 7, the input unit 46 and the main control unit 32 divide the weld time for each resistance welding into first weld time $T_A$ and second weld time $T_B$.

Figure 8:
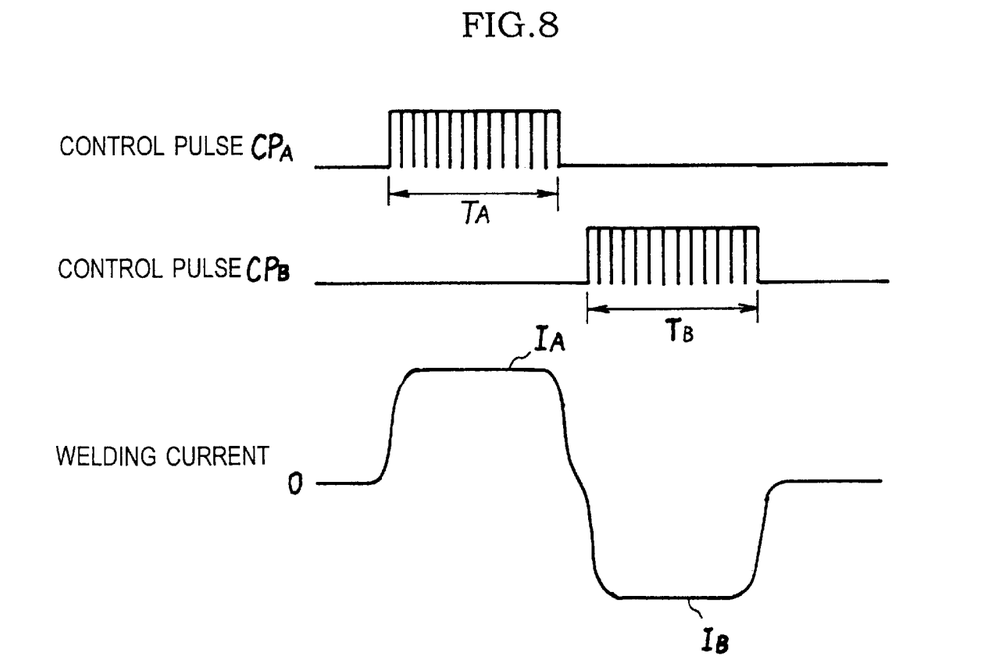
FIG. 8 is a waveform diagram showing control pulses and a welding current in case the power supply apparatus of FIG. 6 is applied to the series welding.

Then, as shown in FIG. 8, during the first weld time $T_A$, only the first and second transistor groups (22A' and 22A) perform a continuous switching action under the PWM control, whereas during the second weld time $T_B$, only the third and fourth transistor groups (22B' and 22B) perform the continuous switching action under the PWM control. Preferably, a constant current control is usually provided to keep the welding current I at a certain value.

Accordingly, as shown in FIG. 8, the first weld time $T_A$ allows a flow of a positive welding current $I_A$ having substantially a trapezoidal current waveform. In this case, as shown in FIG. 7A, the welding current $I_A$ forms a current path which extends from the welding electrode 24 through the material $W_1$ to be welded, a first welding point $P_a$, the material $W_2$ to be welded, a second welding point $P_b$ and again the material $W_1$ to be welded to the welding electrode 26. In other words, at the first welding point $P_a$ the welding current $I_A$ flows from the material $W_1$ to be welded toward the material $W_2$ to be welded, whereas at the second welding point $P_b$ the welding current $I_A$ flows from the material $W_2$ to be welded toward the material $W_1$ to be welded. As a result of this, for instance, the first welding point $P_a$ is subjected to a Peltier effect absorbing heat, whereas the second welding point $p_b$ is subjected to a Peltier effect generating heat.

Therefore, during the first weld time $T_A$, a nugget $N_b$ at the second welding point $P_b$ grows at a higher growth rate than a nugget $N_a$ at the first welding point $P_a$. In consequence, at the end of the first weld time $T_A$, the nugget $N_b$ becomes larger than the nugget $N_a$ as shown in FIG. 7B. A difference in size of the two nuggets $N_a$ and $N_b$ at this point of time depends on the materials ($W_1$, $W_2$) to be welded together, the thickness thereof, the duration of the first weld time $T_A$, the set current value, etc.

However, as shown in FIG. 8, during the second weld time $T_B$, the third and fourth transistor groups (22B', 22B) perform the switching action so as to allow a flow of a negative welding current $I_B$ having substantially a trapezoidal current waveform. In this case, as shown in FIG. 7C, the welding current $I_B$ forms a current path which extends from the welding electrode 26 through the material $W_1$ to be welded, a second welding point $P_b$, the material $W_2$ to be welded, a first welding point $P_a$ and again through the material $W_2$ to be welded to the welding electrode 24. In other words, at the first welding point $P_a$, the welding current $I_B$ flows from the material $W_2$ to be welded toward the material $W_1$ to be welded toward the material $W_2$ to be welded. Thus, this time, the first welding point $P_a$ undergoes a Peltier effect generating heat, whereas the second welding point $p_b$ undergoes a Peltier effect absorbing heat. Therefore, during the second weld time $T_B$, a nugget $N_a$ at the first welding point $P_a$ grows larger than a nugget $N_b$ at the second welding point $P_b$.

In consequence, at the end of the second weld time $T_B$, that is, at the completion of the entire weld time, as shown in FIG. 7D, substantially the same size is conferred on the nugget $N_a$ at the first welding point $P_a$ and on the nugget $N_b$ at the second welding point $P_b$.

Typically, however, during the first weld time $T_A$ the nugget is already formed on each welding part to some extent, lowering the resistance value of the conductive path. This results in a reduction of the heat generation efficiency. Therefore, the nuggets $N_a$ and $N_b$ during the second weld time $T_B$ have their respective growth rates lower than those of the nuggets $N_a$ and $N_b$ during the first weld time $T_A$, whereupon the difference ($N_a > N_b$) in the growth rate between the two nuggets $N_a$ and $N_b$ during the second weld time is smaller than the difference ($N_a < N_b$) during the first weld time $T_A$. As a result of this, the size of the nugget $N_a$ may not reach the size of nugget $N_b$ at the elapse of time equal to the first weld time $T_A$ in the second weld time $T_B$.

Figure 9:
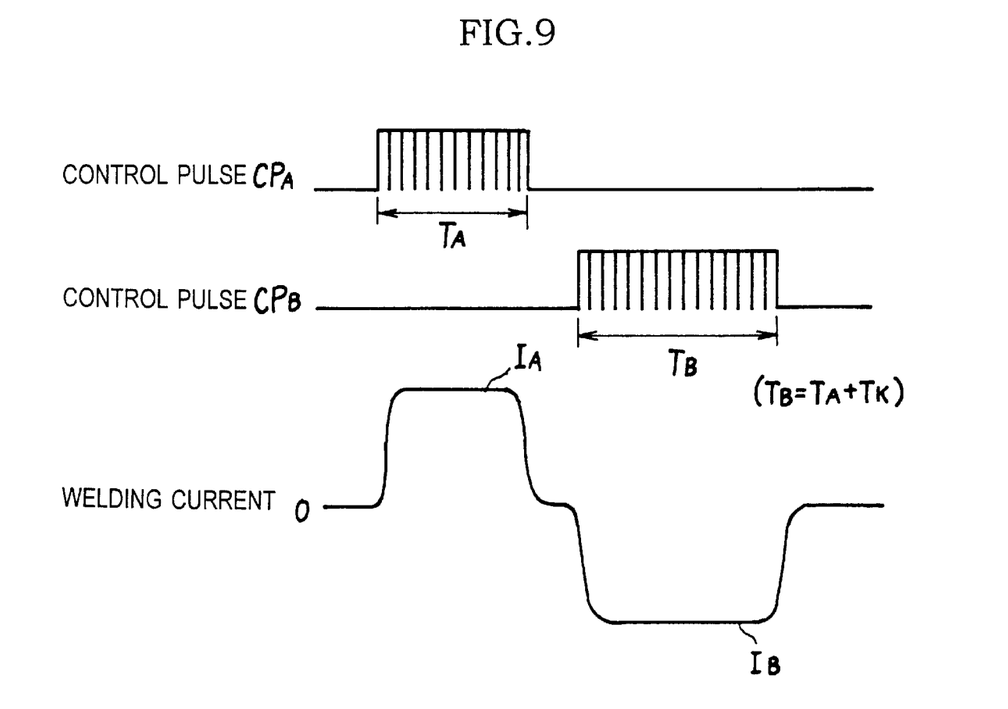
FIG. 9 is a waveform diagram (a nugget compensation waveform) showing other control pulses and the welding current in case the power supply apparatus of FIG. 6 is applied to the series welding.

In such a case, the second weld time $T_B$ is set to be longer than the first weld time $T_A$ by an extension time $T_K$ as shown in FIG. 9 so that the nugget $N_a$ can catch up with the nugget $N_b$ in the extension time $T_K$. The extension time $T_K$ for fulfilling this catch-up condition depends on welding conditions such as the materials ($W_1$, $W_2$) to be welded, the thickness thereof, the duration of the first weld time $T_A$, the set current value, etc. The extension time may be given as an empirical value based on a test welding, etc.

Consequently, at the end of the second weld time $T_B$, substantially the same size is securely conferred on the nugget $N_a$ at the first welding point $P_a$ and on the nugget $N_b$ at the second welding point $p_b$ as shown in FIG. 7D. Thus, a substantially uniform welding strength is imparted to the first welding point $P_a$ and the second welding point $P_b$.

As an alternative, such a nugget compensation may be achieved by setting the current value of the welding current $I_B$ during the second weld time $T_B$ to be larger than the current value of the welding current $I_A$ during the first weld time $T_A$.

This alternative resistance welding control unit also provides excellent build-up characteristics and a waveform control as well as a high power supply efficiency, with securement of an increased welding current and elongated weld time, whereby it is applicable to various metal materials in the above series welding or other precision small-sized resistance welding and ensures a reliable welding finish.

Although the above embodiment uses the single-phase commercial AC power supply 10, the configuration of the charging unit 18 could be modified so as to allow an input of a three-phase commercial AC voltage. The charging unit 18 may be provided with a voltage detecting circuit for detecting a terminal voltage (charging voltage) at the capacitor 20 and with a charging control unit for comparing a voltage detection value with a set voltage value to provide a control of charging of the capacitor 20.

Furthermore, a single transistor having a large current capacity may be employed in place of each transistor group 22A, 22A', 22B and 22B, including a plurality of transistors which are connected in parallel with one another.

The configuration of the control unit 30 in the above embodiment could also be variously modified. For example, the current sensor 34 could be a shunt resistor. Various methods and circuits are available for the measurement and computations of the current, voltage, power, etc. The functions of the main control unit 32 could also be variously modified from its hardware and software aspects.

According to the resistance-welding power supply apparatus of the present invention, as set forth hereinabove, the transistors are interposed between the capacitors and the welding electrodes so that the capacitors are subjected to a switching control at a predetermined frequency during the weld time to provide a control of the welding current or welding power, thereby making it possible to reduce the excess power consumption of the transistors and accordingly improve the power supply efficiency, to secure an increased welding current and elongated weld time.

While illustrative and presently preferred embodiments of the present invention have been described in detail herein, it is to be appreciated that the inventive concepts may be otherwise variously embodied and employed and that the appended claims are intended to be construed to include such variations except insofar as limited by the prior art.

What is claimed is:

1. A resistance-welding power supply apparatus for resistance welding materials to be welded by causing a welding current to flow through a pair of welding electrodes which are in press contact with the materials to be welded, said resistance-welding power supply apparatus comprising:

a capacitor having one end electrically connected to one electrode of the pair of welding electrodes for storing a welding energy in the form of an electric charge;

charging means for charging said capacitor;

a transistor having a first terminal electrically connected to the other end of said capacitor and having a second terminal electrically connected to the other electrode of the pair of welding electrodes; and control means electrically connected to a control terminal of said transistor for providing a switching control of said transistor at a predetermined frequency during a preset weld time.

2. A resistance-welding power supply apparatus according to claim 1, wherein:

said transistor is in the form of a plurality of transistors which are connected in parallel with one another.

3. A resistance-welding power supply apparatus according to claim 2, wherein:

said charging means comprises:

a transformer for stepping down an alternating-current (AC) power supply voltage having a commercial frequency to a predetermined voltage; and a rectifying circuit for rectifying said AC power supply voltage from said transformer into a direct-current (DC) voltage as an output of said rectifying circuit.

4. A resistance-welding power supply apparatus according to claim 1, wherein:

said charging means comprises:

a transformer for stepping down an alternating-current (AC) power supply voltage having a commercial frequency to a predetermined voltage; and a rectifying circuit for rectifying said AC power supply voltage from said transformer into a direct-current (DC) voltage as an output of said rectifying circuit.

5. A resistance-welding power supply apparatus according to claim 1, wherein:

said control means comprises:

current measuring means for measuring the welding current during the preset weld time;

current setting means for providing a desired welding current set value;

current comparing means for comparing a welding current measurement value from said current measuring means with the welding current set value to obtain a comparison error for each unit cycle of the predetermined frequency; and pulse width control means for controlling a pulse width for switching-on time in the next unit cycle in response to the comparison error.

6. A resistance-welding power supply apparatus according to claim 5, wherein:

said control means issue one or several low-frequency pulses having a large pulse width immediately after the start of the preset weld time after which a switching to a predetermined high frequency is made to provide the pulse width control.

7. A resistance-welding power supply apparatus according to claim 1, wherein:

said control means comprises:

voltage measuring means for measuring a voltage between the pair of welding electrodes during the preset weld time;

voltage setting means for providing a desired interelectrode voltage set value;

voltage comparing means for comparing an interelectrode voltage measurement value from said voltage measuring means with the interelectrode voltage set value to obtain a comparison error for each unit cycle of the predetermined frequency; and pulse width control means for controlling a pulse width for switching-on time in the next unit cycle in response to the comparison error.

8. A resistance-welding power supply apparatus according to claim 7, wherein:

said control means issue one or several low-frequency pulses having a large pulse width immediately after the start of the preset weld time after which a switching to a predetermined high frequency is made to provide the pulse width control.

9. A resistance-welding power supply apparatus according to claim 1, wherein:

said control means comprises:

current measuring means for measuring the welding current during the preset weld time;

voltage measuring means for measuring a voltage between said pair of welding electrodes during the preset weld time;

power computing means for computing a welding power fed to in between the pair of welding electrodes on the basis of a welding current measurement value from said current measuring means and an interelectrode voltage measurement value from said voltage measuring means;

power setting means for providing a desired welding power set value;

power comparing means for comparing a welding power computed value from said power computing means with the welding power set value to obtain a comparison error for each unit cycle of the predetermined frequency; and pulse width control means for controlling a pulse width for switching-on time in the next unit cycle in response to the comparison error.

10. A resistance-welding power supply apparatus according to claim 9, wherein:

said control means issue one or several low-frequency pulses having a large pulse width immediately after the start of the preset weld time after which a switching to a predetermined high frequency is made to provide the pulse width control.

11. A resistance-welding power supply apparatus for resistance welding materials to be welded by causing a welding current to flow through a pair of welding electrodes which are in press contact with the materials to be welded, said resistance-welding power supply apparatus comprising:

a capacitor for storing a welding energy in the form of an electric charge;

charging means for charging said capacitor;

a first transistor having a first terminal electrically connected to one electrode of said pair of welding electrodes and having a second terminal electrically connected to one end of said capacitor;

a second transistor having a first terminal electrically connected to the other end of said capacitor and having a second terminal electrically connected to the other electrode of the pair of welding electrodes;

a third transistor having a first terminal electrically connected to the other electrode of said pair of welding electrodes and having a second terminal electrically connected to the one end of said capacitor;

a fourth transistor having a first terminal electrically connected to the other end of said capacitor and having a second terminal electrically connected to the one electrode of said pair of welding electrodes;

control means electrically connected to a control terminal of each of said first to fourth transistors for providing a switching control of said first and second transistors or of said third and fourth transistors at a predetermined frequency during a preset weld time.

12. A resistance-welding power supply apparatus according to claim 11, wherein:

said first to fourth transistors each is in the form of a plurality of transistors which are connected in parallel with one another.

13. A resistance-welding power supply apparatus according to claim 12, wherein:

said charging means comprises:

a transformer for stepping down an alternating-current (AC) power supply voltage having a commercial frequency to a predetermined voltage; and a rectifying circuit for rectifying said AC power supply voltage from said transformer into a direct-current (DC) voltage as an output of said rectifying circuit.

14. A resistance-welding power supply apparatus according to claim 12, wherein:

said control means provide a switching control of said first and second transistors, with said third and fourth transistors remaining off, during a first preset weld time, the first preset weld time and a second preset weld time constituting a weld time for one resistance welding; and said control means provide a switching control of said third and fourth transistors, with said first and second transistors remaining off, during said second preset weld time.

15. A resistance-welding power supply apparatus according to claim 11, wherein:

said charging means comprises:

a transformer for stepping down an alternating-current (AC) power supply voltage having a commercial frequency to a predetermined voltage; and a rectifying circuit for rectifying said AC power supply voltage from said transformer into a direct-current (DC) voltage as an output of said rectifying circuit.

16. A resistance-welding power supply apparatus according to claim 11, wherein:

said control means provide a switching control of said first and second transistors, with said third and fourth transistors remaining off, during a first preset weld time, the first preset weld time and a second preset weld time constituting a weld time for one resistance welding; and said control means provide a switching control of said third and fourth transistors, with said first and second transistors remaining off, during the said second preset weld time.

17. A resistance-welding power supply apparatus according to claim 11, wherein:

said control means comprises:

current measuring means for measuring the welding current during the preset weld time;

current setting means for providing a desired welding current set value;

current comparing means for comparing a welding current measurement value from said current measuring means with the welding current set value to obtain a comparison error for each unit cycle of the predetermined frequency; and pulse width control means for controlling a pulse width for switching-on time in the next unit cycle in response to the comparison error.

18. A resistance-welding power supply apparatus according to claim 17, wherein:

said control means issue one or several low-frequency pulses having a large pulse width immediately after the start of the preset weld time after which a switching to a predetermined high frequency is made to provide the pulse width control.

19. A resistance-welding power supply apparatus according to claim 11, wherein:

said control means comprises:

voltage measuring means for measuring a voltage between the pair of welding electrodes during the preset weld time;

voltage setting means for providing a desired interelectrode voltage set value;

voltage comparing means for comparing an interelectrode voltage measurement value from said voltage measuring means with the interelectrode voltage set value to obtain a comparison error for each unit cycle of the predetermined frequency; and pulse width control means for controlling a pulse width for switching-on time in the next unit cycle in response to the comparison error.

20. A resistance-welding power supply apparatus according to claim 19, wherein:

said control means issue one or several low-frequency pulses having a large pulse width immediately after the start of the preset weld time after which a switching to a predetermined high frequency is made to provide the pulse width control.

21. A resistance-welding power supply apparatus according to claim 11, wherein:

said control means comprises:

current measuring means for measuring the welding current during the preset weld time;

voltage measuring means for measuring a voltage between the pair of welding electrodes during the preset weld time;

power computing means for computing a welding power fed to in between the pair of welding electrodes on the basis of a welding current measurement value from said current measuring means and an interelectrode voltage measurement value from said voltage measuring means;

power setting means for providing a desired welding power set value;

power comparing means for comparing a welding power computed value from said power computing means with the welding power set value to obtain a comparison error for each unit cycle of the predetermined frequency; and pulse width control means for controlling a pulse width for switching-on time in the next unit cycle in response to the comparison error.

22. A resistance-welding power supply apparatus according to claim 21, wherein:

said control means issue one or several low-frequency pulses having a large pulse width immediately after the start of the preset weld time after which a switching to a predetermined high frequency is made to provide the pulse width control.

* * * * *